No. 857,464. PATENTED JUNE 18, 1907.
J. D. ISAACS & J. B. SPEED.
HELICALLY RIFFLED PIPE.
APPLICATION FILED JUNE 23, 1905.
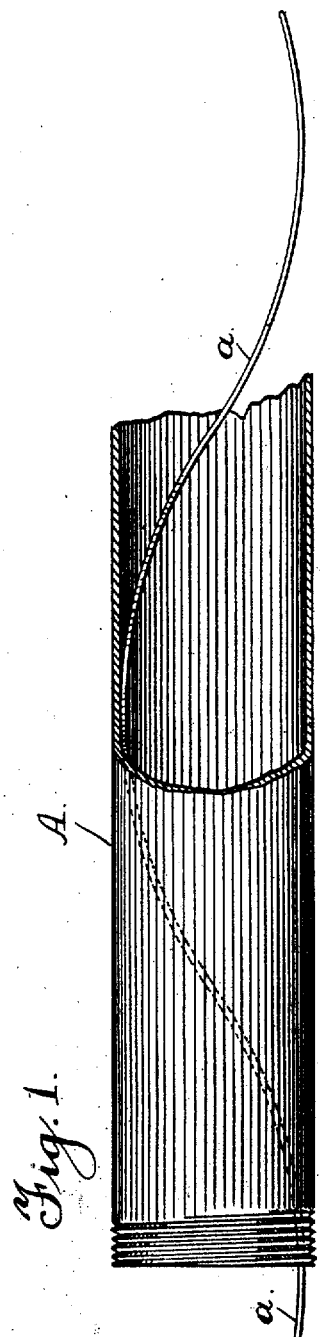
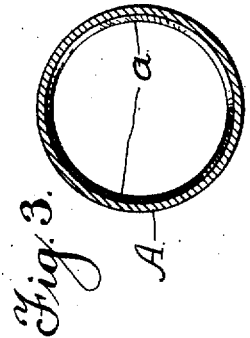
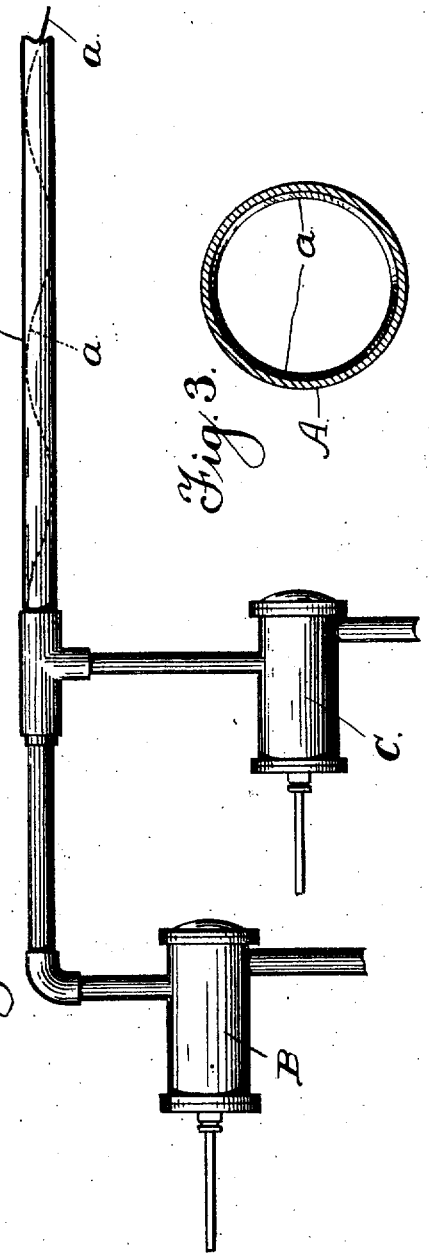
Witnesses:
Arthur L. Slee.
J. Creighton.
Inventors
John Dove Isaacs
James Buckner Speed
by Wm. F. Booth
their Attorney

UNITED STATES PATENT OFFICE.

JOHN DOVE ISAACS, OF OAKLAND, AND JAMES BUCKNER SPEED, OF BERKELEY, CALIFORNIA, ASSIGNORS TO RIFLED PIPE COMPANY, OF SAN FRANCISCO, CALIFORNIA, A CORPORATION OF CALIFORNIA.

HELICALLY-RIFFLED PIPE.

No. 857,464.  Specification of Letters Patent.  Patented June 18, 1907.

Application filed June 23, 1905. Serial No. 266,574.

*To all whom it may concern:*

Be it known that we, JOHN DOVE ISAACS, a citizen of the United States, and a resident of Oakland, Alameda county, State of California, and JAMES BUCKNER SPEED, a citizen of the United States, and a resident of Berkeley, Alameda county, State of California, have invented certain new and useful Improvements in Helically-Riffled Pipe; and we hereby declare the following to be a full, clear, and exact description of the same.

Our invention relates to a pipe constructed and adapted to be used in connection with that art or method of piping a fluid, which consists in advancing the fluid, together with a second fluid of greater specific gravity, through the pipe, with a helical motion about the axis of the fluid content, whereby the fluid of greater specific gravity is caused to form an envelop about the fluid of lesser specific gravity, thereby reducing the friction against the pipe walls. This art or method is fully disclosed in Letters Patent of the United States No. 759,374, granted to us May 10 1904, to which patent reference is hereby made. In this method, the necessary helical motion of the fluid content of the pipe is, in practice, produced by means of a helically directed obstruction of some kind, upon and throughout the interior of the pipe line. We have found that a certain form and construction of the helical obstruction within the pipe is well adapted for the purpose, in that it effects the necessary motion with facility and maintains it with accuracy.

Our present invention has for its object the provision of pipe to be used in constructing a pipe line for this purpose, which is economical in its manufacture and effective in securing the result desired.

To this end, our invention consists in the novel pipe which we shall now describe, by reference to the accompanying drawings, in which—

Figure 1 is an elevation, partly broken, of a piece of our improved pipe. Fig. 2 is an elevation showing the apparatus in which the pipe-line is used, for carrying out the method stated. Fig. 3 is a cross section of our improved pipe-line.

The pipe-line consists of a plurality of sections suitably coupled together. A part of one of these sections A is here shown. The interior of the pipe is fitted with a helically directed wire $a$ which forms the riffle. This wire, in practice, is spring wire and is fitted to place, by being drawn through any given section or any given length of the pipe line. It is fed in from one end from a roll of wire, and pulled through from the other end. When the pulling strain is relieved, the wire, of its own resiliency, will spring outwardly to seat and hold itself against the interior of the pipe in a helical course of more or less pitch, according to the character of the wire and the pulling strain with which it is drawn through the pipe in seating it.

B is the pump by which the lighter fluid is supplied to the pipe-line, and C is the pump by which the heavier fluid is supplied to the said line.

Having thus described our invention, what we claim as new and desire to secure by Letters Patent is—

1. A fluid pipe line having a relatively rigid interior wall, and a helically directed spring wire seated on said wall by its own resilient pressure.

2. A single piece fluid pipe line having a helically directed spring wire seated on the interior wall thereof by its own resilient pressure, the convolutions of the wire being drawn out and widely spaced apart whereby the general direction of the wire is longitudinally of the pipe.

3. In an apparatus for the method stated, a pipe line having on its interior wall a helically directed wire seated by its own resilient pressure, and means for supplying the lighter and heavier fluids to the pipe line.

In witness whereof we have hereunto set our hands.

JOHN DOVE ISAACS.
JAMES BUCKNER SPEED.

Witnesses:
J. COMPTON,
D. B. RICHARDS.